(12) United States Patent
Zhao et al.

(10) Patent No.: US 12,217,188 B2
(45) Date of Patent: Feb. 4, 2025

(54) METHOD AND DEVICE FOR USER GROUPING AND RESOURCE ALLOCATION IN NOMA-MEC SYSTEM BASED

(71) Applicant: NANJING UNIVERSITY OF POSTS AND TELECOMMUNICATIONS, Nanjing (CN)

(72) Inventors: Shasha Zhao, Nanjing (CN); Lidan Qin, Nanjing (CN); Dengyin Zhang, Nanjing (CN); Chenhui Sun, Nanjing (CN); Qing Wen, Nanjing (CN); Ruijie Chen, Nanjing (CN); Yufan Liu, Nanjing (CN)

(*) Notice: Subject to any disclaimer, the term of this patent is extended or adjusted under 35 U.S.C. 154(b) by 0 days.

(21) Appl. No.: 18/637,313

(22) Filed: Apr. 16, 2024

(65) Prior Publication Data

US 2024/0296333 A1 Sep. 5, 2024

Related U.S. Application Data

(63) Continuation of application No. PCT/CN2022/127173, filed on Oct. 25, 2022.

(51) Int. Cl.
*G06N 3/092* (2023.01)
*H04L 5/00* (2006.01)

(52) U.S. Cl.
CPC .......... *G06N 3/092* (2023.01); *H04L 5/0005* (2013.01); *H04L 5/0037* (2013.01)

(58) Field of Classification Search
CPC ..... H04L 5/0037; H04L 5/0023; H04L 5/006; H04L 5/0053; H04L 5/001; H04L 5/0064; H04L 41/16; H04L 5/0007; H04L 5/0048; H04L 5/0062; H04L 5/0078; H04L 41/046; H04L 41/0806; H04L 5/003;
(Continued)

(56) References Cited

U.S. PATENT DOCUMENTS

2020/0115047 A1* 4/2020 Cao ................. G08G 5/0021
2022/0159586 A1* 5/2022 Choi ................ H04W 72/0473

FOREIGN PATENT DOCUMENTS

| CN | 112601258 A | * | 4/2021 | ............ H04W 28/16 |
| CN | 113543342 A |   | 10/2021 | |
| CN | 113778691 A |   | 12/2021 | |

OTHER PUBLICATIONS

"Delay Minimization for NOMA-MEC Offloading" (Year: 2018).*
(Continued)

*Primary Examiner* — Luis A Sitiriche

(57) ABSTRACT

The present application discloses a method and a device for user grouping and resource allocation in a NOMA-MEC system. The hybrid deep reinforcement learning algorithm proposed in the present application solves the hybrid problem of deep reinforcement learning that is difficult to deal with both discrete and continuous action spaces by using DDPG to optimize continuous actions and DQN to optimize discrete actions. Specifically, the algorithm determines a bandwidth allocation, an offloading decision, and a subchannel allocation (user grouping) of the user device based on the user's channel state, in order to maximize the ratio of the computation rate to the consumed power of the system. The algorithm is well adapted to the dynamic characteristics of the environment and effectively improves the energy efficiency and spectrum resource utilization of the system.

2 Claims, 2 Drawing Sheets

(58) Field of Classification Search
CPC ... H04L 5/0055; H04L 1/0026; H04L 5/0057; H04L 1/0045; H04L 27/2602; H04L 27/38; H04L 5/00; H04L 5/0005; H04L 5/0044; H04L 5/0091; H04L 5/0094; H04L 5/023; H04L 5/14; H04L 5/22; H04L 67/10; H04L 1/0001; H04L 25/022; H04L 25/0224; H04L 25/0254; H04L 47/22; H04L 5/0033; H04L 5/0035; H04L 5/0042; H04L 5/0046; H04L 5/0051; H04L 5/0058; H04L 5/0067; H04L 5/0073; H04L 5/0076; H04L 5/0092; H04W 24/02; H04W 52/346; H04W 72/0453; H04W 72/23; H04W 72/53; H04W 72/54; H04W 72/04; H04W 24/00; H04W 48/20; H04W 52/242; H04W 52/50; H04W 72/0446; H04W 72/12; H04W 72/535; H04W 72/542; H04W 74/002; H04W 74/0875; H04W 52/241; H04W 52/267; H04W 72/121; H04W 74/0833; H04W 16/06; H04W 16/14; H04W 4/08; H04W 52/42; H04W 72/046; H04W 72/1263; H04W 72/1273; H04W 72/20; H04W 72/541; H04W 72/566; H04W 88/08; H04W 24/08; H04W 28/16; H04W 48/02; H04W 52/143; H04W 52/20; H04W 52/243; H04W 72/0473; H04W 72/56; H04W 76/50; H04W 84/12; H04W 88/06; G06N 3/006; G06N 3/045; G06N 7/01; G06N 20/00; G06N 3/044; G06N 3/08; G06N 3/084; G06N 3/04; G06N 3/0464; G06N 3/098; G06N 3/126; G06N 3/043; G06N 3/047; G06N 3/088; G06N 3/09; G06N 3/092; G06N 5/01; G06N 7/046; G06F 9/5044

See application file for complete search history.

(56) References Cited

OTHER PUBLICATIONS

"Optimal Resource Allocation for Delay Minimization in NOMA-MEC Networks" (Year: 2020).*
"Joint Power and Time Allocation for NOMA-MEC Offloading" (Year: 2019).*
CN112601258A—English Translation.*
Internation Search Report of PCT/CN2022/127173, Mailed Dec. 28, 2022.
Chen, Zhao et al., "Decentralized computation offloading for multi-user mobile edge computing: a deep reinforcement learning approach", EURASIP Journal on Wireless Communications and Networking, No. 188, Dec. 31, 2020, entire document.

\* cited by examiner

METHOD AND DEVICE FOR USER GROUPING AND RESOURCE ALLOCATION IN NOMA-MEC SYSTEM BASED

CROSS-REFERENCE TO RELATED APPLICATIONS

This application claims priority to Chinese Patent Application No. 202210282489.0, titled "Method and Device for User Grouping and Resource Allocation in NOMA-MEC System", filed Mar. 22, 2022, the entire disclosure of which is incorporated herein by reference.

TECHNICAL FIELD

The present application belongs to the field of mobile communication and deep reinforcement learning, and specifically relates to a computational offloading method and device in a NOMA-MEC system.

BACKGROUND

With the significant increase in the number of smart devices, a large number of user devices generate a large amount of data that needs to be processed. However, due to the size limitation of smart devices, it is poor in both computational and energy resources, which makes them face a great challenge of service demand. Therefore, in order to improve the efficiency of task processing to meet the service demand, a Mobile Edge Computing (MEC) technology has emerged. In addition, the explosive growth of data traffic has caused the urgent demand for massive access and the problem of acute shortage of spectrum resources, and the fifth generation (5G) communication in the Non-Orthogonal Multiple Access (NOMA) technology is an effective solution to these problems. Therefore, the technical research of NOMA-MEC has attracted much attention in recent years.

Most of the current studies on user grouping and resource allocation strategies in NOMA-MEC systems use traditional optimization methods, such as iterative algorithms to converge to an optimal solution or heuristic algorithms to obtain a suboptimal solution. However, these methods either have too high computational complexity, or can only obtain suboptimal solutions, and more importantly, lack the ability to adapt to dynamic systems.

SUMMARY

The purpose of the present application is to propose a method for a grouping user and resource allocation in a NOMA-MEC system based on hybrid deep reinforcement learning, which is capable of scheduling resources in real time in a dynamic NOMA-MEC system to maximize the energy efficiency of the system.

In order to achieve the above purpose, the present application provides the following technical solutions:

A method for user grouping and resource allocation in a NOMA-MEC system includes:
Step 1, describing the NOMA-MEC system which operates in a time slot, wherein a set of time slots is denoted as $\Gamma=\{1, 2, \ldots, T\}$.
Step 2, defining an energy efficiency of the NOMA-MEC system;
Step 3, describing an optimization problem;
Step 4, defining a state space for deep reinforcement learning, and an action space for the deep reinforcement learning;
Step 5, constructing a hybrid deep reinforcement learning network, wherein an input of the hybrid deep reinforcement learning network is a state and an output of the hybrid deep reinforcement learning network is an action;
Step 6, inputting a state of each of the time slots into the hybrid deep reinforcement learning network to generate the action;
Step 7, training the hybrid deep reinforcement learning network; and
Step 8, repeating steps 6 and 7 until a number of repetitions reaches a specified number of time slots T, and outputting a decision to be optimized comprising the user grouping, calculation of offloading, and a bandwidth allocation ratio at this time.

In an embodiment, the describing the NOMA-MEC system includes:
the NOMA-MEC system comprises K user devices and a single antenna base station connected to an edge server, and all users have only a single transmitting antenna to establish a communication link with the single antenna base station; and the NOMA-MEC system operates in the time slot, wherein the set of time slots is denoted as $\Gamma=\{1, 2, \ldots, T\}$;
dividing a total bandwidth B of the NOMA-MEC system into N orthogonal sub-channels n, wherein a ratio of a bandwidth of the sub-channel n to the total bandwidth is $\tau_n$, $$\sum_{n=1}^{N} \tau_n = 1;$$

wherein $K=\{1, 2, \ldots, K\}$ and $N=\{1, 2, \ldots, N\}$ represent a set of users and a set of the orthogonal sub-channels, respectively, $K \leq 2N$;
dividing a whole process into the time slots $\Gamma=\{1, 2, \ldots, T\}$; a channel gain remains constant over a time period of one time slot and varies between different time slots, $h_{nk}$, $n \in N$, $k \in K$ denotes the channel gain on the sub-channel n from a user k to the single antenna base station, and $h_{n1} < h_{n2} < \ldots < h_{nK}$, $n \in [1,N]$ is set; and
limiting one sub-channel only to transmit at most two user signals simultaneously, and the user transmitting signals on only one sub-channel in one time slot; wherein $m_{nk}=1$ indicates that the sub-channel n is allocated to the user k for transmitting signals, $m_{nk}=0$ indicates that the sub-channel n is not allocated to the user k for transmitting signals.

In an embodiment, the defining the energy efficiency of the NOMA-MEC system includes:
Step 2.1) the energy efficiency Y of the NOMA-MEC system is defined as a sum of a ratio of a computation rate to a computation power of all users, as in a following formula:

$$Y = \sum_{n=1}^{N}\sum_{i=2}^{K}\sum_{j=1}^{i-1} x_{ni}\frac{R_{i,off}}{p_i} + x_{nj}\frac{R_{j,off}}{p_j} + (1-x_{ni})\frac{R_{i,local}}{P_{i,local}} + (1-x_{nj})\frac{R_{j,local}}{P_{j,local}}$$

wherein, $R_{i,off}$ denotes a computation rate at which a user i offloads computational tasks to the edge server for execution, $p_i$ is a transmitting power of the user i, and does not vary over time and is the same for all users; $R_{i,local}$ denotes a computation rate at which the user i locally executes a task, $p_{i,local}$ denotes a power at which the user i locally executes the task, $x_{ni}=1$ denotes that the user i offloads the task through the sub-channel n to the edge server for execution, $x_{ni}=0$ denotes that the user i does not offload the task through the sub-channel n to the edge server for execution;

Step 2.2) because a channel gain $h_{ni}$ of the user i on the sub-channel n is greater than a channel gain $h_{nj}$ of an user j; the single antenna base station decodes in descending orders according to a serial interference cancellation technique, an offload rate of the user i is $$R_{i,off} = m_{ni}\tau_n W\log_2(1 + \frac{p_i h_{ni}}{x_{nj} m_{nj} p_j h_{ni} + \tau_n W N_0}),$$

an offload rate of the user j is $$R_{j,off} = m_{nj}\tau_n W\log_2(1 + \frac{p_j h_{nj}}{\tau_n W N_0}),$$

where $N_0$ is a power spectral density of noise; and

Step 2.3) computation rates of the user i and the user j locally executed are $$R_{i,local} = \frac{f_i}{\varnothing} \text{ and } R_{j,local} = \frac{f_j}{\varnothing},$$

respectively, where $f_i$ and $f_j$ are a CPU processing power of the user, and $\varnothing$ is a number of cycles required to process a 1bit task; computation powers of the user i and the user j locally executed are $p_{i,local}=vf_i^3$ and $p_{j,local}=vf_j^3$ respectively, where v is a capacitive effective factor of a chip architecture of a user device.

In an embodiment, the optimization problem is described as:

$$\max_{m_{nk},x_{nk},\tau_n} \sum_{n=1}^{N}\sum_{i=2}^{K}\sum_{j=1}^{i-1}\left( x_{ni}\frac{m_{ni}\tau_n W\log_2(1 + \frac{p_i h_{ni}}{x_{nj} m_{nj} p_j h_{nj} + \tau_n W N_0})}{p_i} + \right.$$

$$\left. x_{nj}\frac{m_{nj}\tau_n W\log_2(1 + \frac{p_j h_{nj}}{\tau_n W N_0})}{p_j} + (1-x_{ni})\frac{1}{v\varnothing_i f_i^2} + (1-x_{nj})\frac{1}{v\varnothing_j f_j^2} \right)$$

s.t. $C1$: $x_{nk} \in \{0,1\}$, $m_{nk} \in \{0,1\}$, $\forall n \in [1, N]$, $\forall k \in [1, K]$, $C2$: $\sum_{n=1}^{N} m_{nk} \leq 1$, $\forall k \in [1, K]$ $C3$: $\sum_{k=1}^{K} m_{nk} \leq 2$, $\forall n \in [1, N]$ $C4$: $\sum_{n=1}^{N} \tau_n = 1$.

In an embodiment the defining the state space for deep reinforcement learning, and the action space for deep reinforcement learning includes:

Step 4.1) the state space s, $s=\{h_{11}, h_{12}, \ldots h_{1K}, h_{21}, h_{22}, \ldots, h_{2K}, h_{N1} \ldots h_{NK}\}$;

Step 4.2) the action space a comprises two phases $a=\{a\_c, a\_d\}$, wherein $a\_c=\{\tau_1, \tau_2, \ldots, \tau_N\}$ is a continuous action which indicates a bandwidth allocation ratio of the NOMA-MEC system, and $a\_d=\{m_{11},m_{12}, \ldots, m_{1K}, \ldots, m_{N1}, m_{N2}, \ldots, m_{NK}, x_{11}, x_{12}, \ldots, x_{1K}, \ldots, x_{N1}, \ldots x_{N2}, \ldots, x_{NK}\}$ is a discrete action which indicates an allocation scheme of the sub-channel n.

In an embodiment, the constructing the hybrid deep reinforcement learning network includes:

the hybrid deep reinforcement network includes a continuous layer deep reinforcement learning network and a discrete layer deep reinforcement learning network; the continuous layer deep reinforcement learning network is a deep deterministic policy gradient (DDPG), and the discrete layer deep reinforcement learning network is a deep Q-Network (DQN).

In an embodiment, the inputting the state of each of the time slots into the hybrid deep reinforcement learning network to generate the action includes:

Step 6.1) inputting the state of the NOMA-MEC system into the hybrid deep reinforcement learning network, generating the bandwidth allocation ratio a_c by an Actor network of the DDPG, and generating a user grouping situation a_d by the DQN network; and Step 6.2) after the user grouping situation and the bandwidth allocation ratio are determined, a maximum energy efficiency of the NOMA-MEC system is decomposed into a maximum energy efficiency of each sub-channel;

the problem is transformed into $$\max_{x_{n,k},x_{n,j}} Y_n = x_{ni}\frac{\tau_n W\log_2(1 + \frac{p_i h_{ni}}{x_{nj} m_{nj} p_j h_{nj} + \sigma^2})}{p_i} +$$

$$x_{nj}\frac{m_{nj}\tau_n W\log_2(1 + \frac{p_j h_{nj}}{\sigma^2})}{p_j} + (1-x_{ni})\frac{1}{v\varnothing_i f_i^2} + (1-x_{nj})\frac{1}{v\varnothing_j f_j^2}$$

where a matrix X is initialized as a zero matrix at each time; $(x_{n,i}, x_{n,j})$ has four possible values, (0, 0), (1, 0), (0, 1), (1, 1), where a value of x is to determine an offloading decision, where 0 means that no computation task of a user device is offloaded to the edge server for execution, and 1 means that offloading to the edge server for execution, and the four possible values is inputted into above formula to select one which makes $Y_n$ the maximum, and a value of a position corresponding to the matrix X is reset.

In an embodiment, the training the hybrid deep reinforcement learning network includes:

the base station in a state s receives an immediate reward $$r = \sum_{n=1}^{N} Y_n$$

feedback from environment after performing the action a={a_c,a_d}, and obtaining a state s' of a next time slot;

storing a sample (s,a_c,r,s') to a DDPG experience pool, and storing a sample (s,a_d,r,s') to a DQN experience pool, and the DDPG network and the DQN network share the state and the reward value; and training the DDPG network and the DQN network to update their own parameters by sampling D samples from the experience pool.

In a second aspect, the present application provides a device for user grouping and resource allocation in a NOMA-MEC system, including:
- a system description module configured for describing the NOMA-MEC system;
- an efficiency definition module configured for defining an energy efficiency of the NOMA-MEC system;
- a problem description module configured for describing an optimization problem;
- a space definition module configured for defining a state space for deep reinforcement learning, and an action space for deep reinforcement learning;
- a network construction module configured for constructing a hybrid deep reinforcement learning network, wherein an input of the hybrid deep reinforcement learning network is a state and an output of the hybrid deep reinforcement learning network is an action;
- an action generation module configured for inputting a state of each of the time slots into the hybrid deep reinforcement learning network to generate the action;
- a network training module configured for training the hybrid deep reinforcement learning network; and
- an outputting module configured for after a number of repetitions reaches a specified number of time slots T, outputting a decision to be optimized comprising the user grouping, calculation of offloading, and a bandwidth allocation ratio at this time.

Beneficial effects of the present application compared to the related art are:

The present application proposes a novel hybrid deep reinforcement learning algorithm based on the NOMA-MEC system, which can solve the problem of having both discrete and continuous action spaces, and dynamically decide the allocation of sub-channel, calculate the offloading decision, and a bandwidth allocation scheme based on the state of the system in real time, in order to maximize the long-term energy efficiency of the system. The main problem solved is that the algorithm decides the bandwidth allocation ratio, a user grouping situation, and a task offloading decision based on time-varying channel conditions.

2. The present application uses the proposed method to determine the user grouping situation, computational offloading decision, and bandwidth allocation ratio to maximize the ratio of computational rate to power consumed of the system in a NOMA-MEC scenario.

3. The method of the present application can make optimal decisions in dynamic environments, and the proposed hybrid deep reinforcement learning method can overcome the shortcomings of a single deep reinforcement learning method that cannot deal with tasks with both continuous and discrete action spaces.

DETAILED DESCRIPTION OF THE EMBODIMENTS

The present application is further described below in conjunction with the accompanying drawings. The following embodiments are only used to illustrate the technical solution of the present application more clearly, and are not to be used to limit the scope of the present application.

Embodiment I

Figure 1:
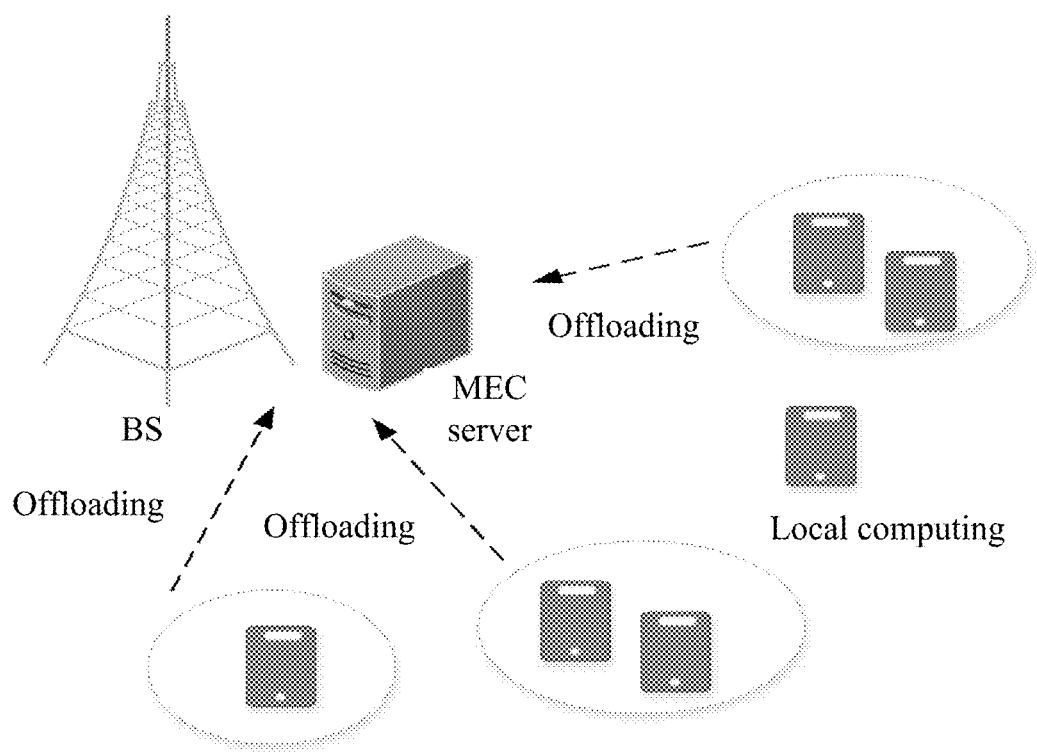
FIG. 1 is a schematic diagram of a system network of the present application.
Figure 2:
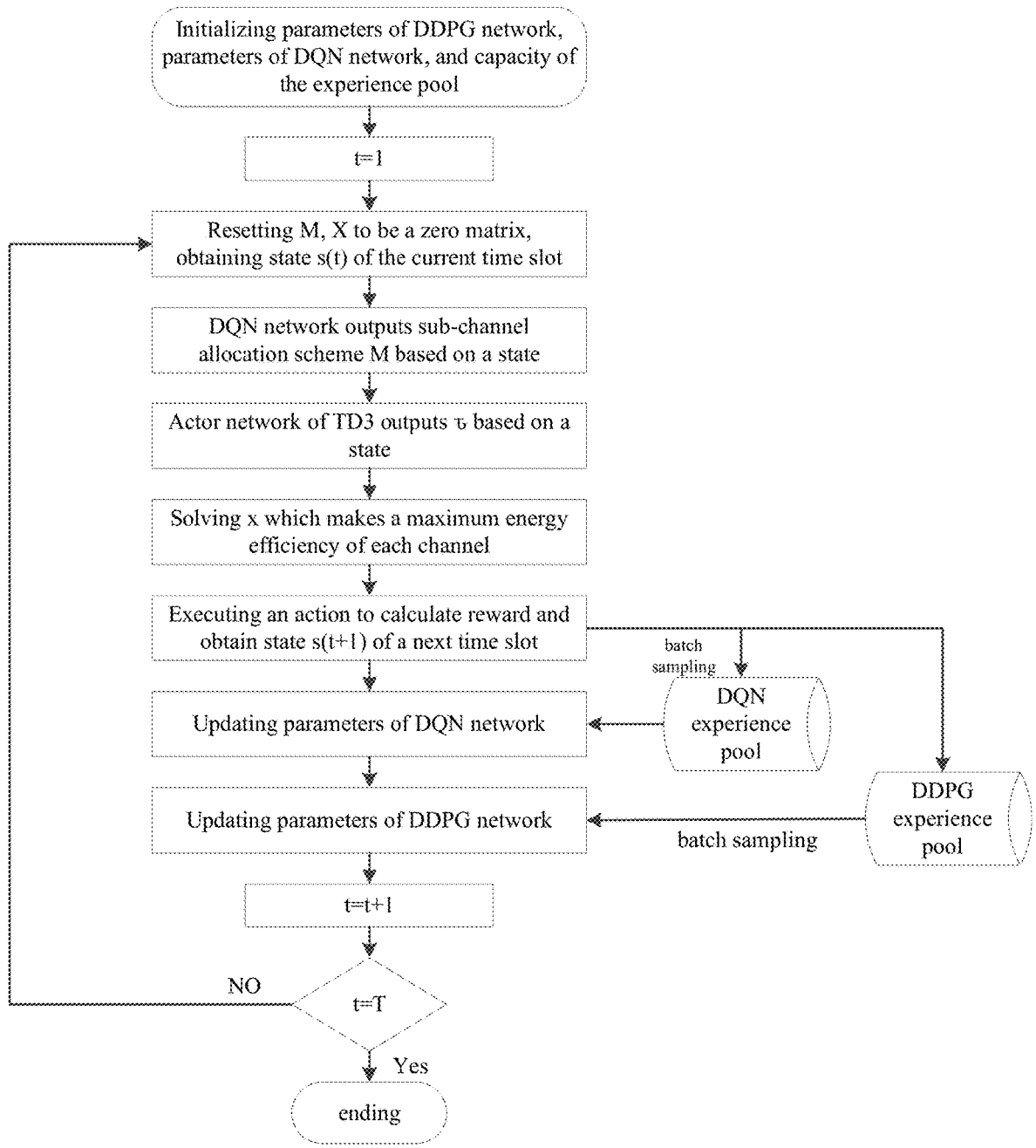
FIG. 2 is a flowchart of the hybrid deep reinforcement learning algorithm.

As shown in FIG. 1, a method for user grouping and resource allocation in a NOMA-MEC system based on hybrid deep reinforcement learning includes:
- Step 1, describing the NOMA-MEC system which operates in a time slot, wherein a set of time slots is denoted as $\Gamma=\{1, 2, \ldots, T\}$;
- Step 2, defining an energy efficiency of the NOMA-MEC system;
- Step 3, describing an optimization problem;
- Step 4, defining a state space for deep reinforcement learning, and an action space for the deep reinforcement learning;
- Step 5, constructing a hybrid deep reinforcement learning network, wherein an input of the hybrid deep reinforcement learning network is a state and an output of the hybrid deep reinforcement learning network is an action;
- Step 6, inputting a state of each of the time slots into the hybrid deep reinforcement learning network to generate the action;
- Step 7, training the hybrid deep reinforcement learning network; and
- Step 8, repeating steps 6 and 7 until a number of repetitions reaches a specified number of time slots T, and outputting a decision to be optimized comprising the user grouping, calculation of offloading, and a bandwidth allocation ratio at this time.

In an embodiment, in step 1, the describing the NOMA-MEC system includes:
Step 1.1, the NOMA-MEC system includes K user devices and a single antenna base station connected to an edge server, and all users have only a single transmitting antenna to establish a communication link with the single antenna base station. A total bandwidth B of the NOMA-MEC system is divided into N orthogonal sub-channels, a ratio of a bandwidth of the sub-channel n to the total bandwidth is $\tau_n$, $$\sum_{n=1}^{N} \tau_n = 1.$$

$K=\{1, 2, \ldots, K\}$ and $N=\{1, 2, \ldots, N\}$ represent a set of users and a set of the orthogonal sub-channels, respectively, $K \leq 2N$. The present application divides a whole process into the time slots $\Gamma=\{1, 2, \ldots, T\}$. A channel gain remains constant over a time period of one time slot and varies between different time slots, $h_{nk}, n \in N, k \in K$ denotes the channel gain on the sub-channel n from a user k to the single antenna base station, and $h_{n1} < h_{n2} < \ldots < h_{nK}, n \in [1,N]$ is set. In the NOMA scenario, multiple users can transmit signals in the same sub-channel at the same time to avoid excessive interference from users in the sub-channel. The present application limits one sub-channel to transmit at most two user signals simultaneously, and the user transmits signals on one sub-channel in one time slot; $m_{nk}=1$ indicates that the sub-channel n is allocated to the user k for transmitting signals, $m_{nk}=0$ indicates that the sub-channel n is not allocated to the user k for transmitting signals.

In an embodiment, in step 2, the defining the energy efficiency of the NOMA-MEC system includes:

Step 2.1) the energy efficiency Y of the NOMA-MEC system is defined as a sum of a ratio of a computation rate to a computation power of all users, as in a following formula:

$$Y = \sum_{n=1}^{N}\sum_{i=2}^{K}\sum_{j=1}^{i-1} x_{ni}\frac{R_{i,off}}{p_i} + x_{nj}\frac{R_{j,off}}{p_j} + (1-x_{ni})\frac{R_{i,local}}{p_{i,local}} + (1-x_{nj})\frac{R_{j,local}}{p_{j,local}}$$

In order to facilitate the expression of the formula, the description of the time slot t is omitted from the present application. $R_{i,off}$ denotes a computation rate at which a user i offloads computational tasks to the edge server for execution, $p_i$ is a transmitting power of the user i, and does not vary over time and is the same for all users; $R_{i,local}$ denotes a computation rate at which the user i locally executes a task, $p_{i,local}$ denotes a power at which the user i locally executes the task, $x_{ni}=1$ denotes that the user i offloads the task through the sub-channel n to the edge server for execution, $x_{ni}=0$ denotes that the user i does not offload the task through the sub-channel n to the edge server for execution.

Step 2.2) because a channel gain $h_{ni}$ of the user i on the sub-channel n is greater than a channel gain $h_{nj}$ of an user j; the single antenna base station decodes in descending orders according to a serial interference cancellation technique, an offload rate of the user i is $$R_{i,off} = m_{ni}\tau_n W\log_2(1 + \frac{p_i h_{ni}}{x_{nj}m_{nj}p_j h_{ni} + \tau_n W N_0}),$$

an offload rate of the user j is $$R_{j,off} = m_{nj}\tau_n W\log_2(1 + \frac{p_j h_{nj}}{\tau_n W N_0}),$$

where $N_0$ is a power spectral density of noise.

Step 2.3) computation rates of the user i and the user j locally executed are $$R_{i,local} = \frac{f_i}{\varnothing} \text{ and } R_{j,local} = \frac{f_j}{\varnothing},$$

are respectively, where $f_i$ and $f_j$ are a CPU processing power of the user, and $\mathsf{L}$ is a number of cycles required to process a 1bit task; computation powers of the user i and the user j locally executed are $p_{i,local}=vf_i^3$ and $p_{j,local}=vf_j^3$ respectively, where v is a capacitive effective factor of a chip architecture of a user device.

In an embodiment, in step 3, the optimization problem is described as:

$$\max_{m_{nk},x_{nk},\tau_n}\sum_{n=1}^{N}\sum_{i=2}^{K}\sum_{j=1}^{i-1}\left(x_{ni}\frac{m_{ni}\tau_n W\log_2\left(1+\frac{p_i h_{ni}}{x_{nj}m_{nj}p_j h_{nj}+\tau_n W N_0}\right)}{p_i}\right.$$

$$\left. + x_{nj}\frac{m_{nj}\tau_n W\log_2\left(1+\frac{p_j h_{nj}}{\tau_n W N_0}\right)}{p_j} + (1-x_{ni})\frac{1}{v\varnothing_i f_i^2} + (1-x_{nj})\frac{1}{v\varnothing_j f_j^2}\right)$$

-continued s.t. C1: $x_{nk} \in \{0,1\}$, $m_{nk} \in \{0,1\}$, $\forall n \in [1,N]$, $\forall k \in [1,K]$, C2: $\sum_{n=1}^{N} m_{nk} \le 1$, $\forall k \in [1, K]$ C3: $\sum_{k=1}^{K} m_{nk} \le 2$, $\forall n \in [1, N]$ C4: $\sum_{n=1}^{N} \tau_n = 1$ In an embodiment, in step 4, the defining the state space for deep reinforcement learning, and the action space for deep reinforcement learning includes:

Step 4.1) the state space s, s={$h_{11}$, $h_{12}$, ..., $h_{1K}$, $h_{21}$, $h_{22}$, ..., $h_{2K}$, $h_{N1}$ ... $h_{NK}$};

Step 4.2) the action space a comprises two phases a={a_c, a_d}, a_c={$\tau_1, \tau_2, \ldots, \tau_N$} is a continuous action which indicates a bandwidth allocation ratio of the NOMA-MEC system, and a_d={$m_{11}, m_{12}, \ldots, m_{1K}, \ldots, m_{N1}, m_{N2}, \ldots, m_{NK}, x_{11}, x_{12}, \ldots, x_{1K}, \ldots, x_{N1}, x_{N2}, \ldots, x_{NK}$} is a discrete action which indicates an allocation scheme of the sub-channel.

In an embodiment, in step 5, the constructing the hybrid deep reinforcement learning network includes:

Step 5.1) constructing a hybrid deep reinforcement learning network, which consists of two layers. The continuous layer deep reinforcement learning network is deep deterministic policy gradient (DDPG). The discrete layer deep reinforcement learning network is deep Q-Network (DQN).

Step 5.2) the DDPG network consists of the current Actor network, the target Actor network, the current Critic network, and the target Critic network. The four networks are $\theta_{DDPG}$, $\theta'_{DDPG}$, $\omega_{DDPG}$ and $\omega'_{DDPG}$. The role of the Actor network is to output action decisions based on the state of the input, and the role of the Critic network is to estimate the value—Q value—of a certain action taken by the Actor network in a certain state, and guide the selection of the action in the next state. The DQN network consists of the DQN current network and the DQN target network, and the parameters of the two networks are $\omega_{DQN}$ and $\omega'_{DQN}$, respectively. A neural network is constructed, parameters of DDPG network, parameters of DQN network, and capacity of the experience pool are initialized.

In an embodiment, in step 6, the inputting the state of each of the time slots into the hybrid deep reinforcement learning network to generate the action includes:

inputting the state of the NOMA-MEC system into the hybrid deep reinforcement learning network, generating the bandwidth allocation ratio a_c by an Actor network of the DDPG, and generating a user grouping situation a_d by the DQN network. At this time, a maximum energy efficiency of the NOMA-MEC system is decomposed into a maximum energy efficiency of each sub-channel based on the user grounding situation $m_{nk}$ and the bandwidth allocation ratio $\tau_{nk}$.

The problem is transformed into $$\max_{x_{n,i},x_{n,j}} Y_n = x_{ni}\frac{\tau_n W\log_2\left(1+\frac{p_i h_{ni}}{x_{nj}m_{nj}p_j h_{ni}+\sigma^2}\right)}{p_i} +$$

$$x_{nj}\frac{m_{nj}\tau_n W\log_2\left(1+\frac{p_j h_{nj}}{\sigma^2}\right)}{p_j} + (1-x_{ni})\frac{1}{v\phi_i f_i^2} + (1-x_{nj})\frac{1}{v\phi_j f_j^2}$$

A matrix X is initialized as a zero matrix at each time; $(x_{n,i}, x_{n,j})$ has four possible values, (0, 0), (1, 0), (0, 1), (1, 1), where a value of x is to determine an offloading decision, where 0 means that no computation task of a user device is offloaded to the edge server for execution, and 1 means that offloading to the edge server for execution, and the four possible values is inputted into above formula to select one which makes $Y_n$ the maximum, and a value of a position corresponding to the matrix X is reset.

In an embodiment, in step 7, the training the hybrid deep reinforcement learning network includes:

the base station in a state s receives an immediate reward $$r = \sum_{n=1}^{N} Y_n$$

feedback from environment after performing the action a={a_c,a_d} and obtaining a state s' of a next time slot; and storing a sample (s,a_c,r,s') to a DDPG experience pool, and storing a sample (s,a_d,r,s') to a DQN experience pool, and the DDPG network and the DQN network share the state and the reward value.

In the process of running the hybrid deep reinforcement learning network, it is necessary to continuously train the network and adjust the network parameters to improve the function fitting ability, so that the algorithm can always output reasonable action decisions in the dynamically changing state environment.

The parameters of the current DQN network are adjusted by minimizing the cost function of the neural network, which is as follows:

$$L(\omega_{DQN}) = \frac{1}{D}\sum_{j=1}^{D}\left(r_j + \gamma\max_{a'}Q_{w'_{DQN}}(s'_j, a') - Q_{\omega_{DQN}}(s_j, a_j)\right)^2 \quad (2.17)$$

where D is a size of the samples taken from the experience pool.

After the current DQN network is updated some times, the weight of the current DQN network is copied to the DQN destination network.

The following table shows how each parameter of the DDPG network is updated. The formula for updating parameters of the current Critic network is as follows:

$$J(\omega) = \frac{1}{D}\sum_{j=1}^{D}\left(y_j - Q_{w_{DDPG}}(s_j, a_j)\right)^2 \quad (3.14)$$

$$y(j) = r_j + \gamma/Q_{w_{DDPG}}(s'_j, \pi_{\theta'_{DDPG}}(s_j)) \quad (3.15)$$

The update of the weight of the current Actor network depends on the Q value of the current Critic network, and the current Actor network updates its network parameters in the direction that it can earn a larger cumulative reward, and the update formula for the parameters of the current Actor network is as follows:

$$\nabla_{\theta_{DDPG}} J(\theta_{DDPG}) = \frac{1}{D}\sum_{j=1}^{D} \nabla_a Q(s_j, a_j) \nabla_{\theta_{DDPG}} \pi_{\theta_{DDPG}}(s_j) \quad (3.16)$$

Unliking the DQN algorithm, which directly copies the parameters of the current DQN network to the parameters of the target DQN network, DDPG uses the soft update mode to update the parameters of the target network, and the soft update formula is as follows:

$$\begin{cases} w'_{DDPG} \leftarrow \tau w_{DDPG} + (1-\tau)w'_{DDPG} \\ \theta'_{DDPG} \leftarrow \tau\theta_{DDPG} + (1-\tau)\theta'_{DDPG} \end{cases} \quad (3.17)$$

$\tau$ is generally taken 0.001.

Step 8: repeating steps 6 and 7 until the number of repetitions is the total number of times in the time slot T, so as to stop the algorithm from running.

To sum up, the present application establishes a NOMA-MEC system, and proposes a new sub-channel allocation, computational offloading decision, and a bandwidth allocation scheme based on hybrid deep reinforcement learning to maximize the long-term energy efficiency of the system.

It should be noted that the above embodiments are only the specific embodiments of the present application, but the scope of the present application is not limited to this. All substitutions, improvements, etc. based on the present application shall be included in the claims of the present application.

In a second aspect, the present application provides a device for user grouping and resource allocation in a NOMA-MEC system based on hybrid deep reinforcement learning, including:

a system description module configured for describing the NOMA-MEC system;

an efficiency definition module configured for defining an energy efficiency of the NOMA-MEC system;

a problem description module configured for describing an optimization problem;

a space definition module configured for defining a state space for deep reinforcement learning, and an action space for deep reinforcement learning;

a network construction module configured for constructing a hybrid deep reinforcement learning network, wherein an input of the hybrid deep reinforcement learning network is a state and an output of the hybrid deep reinforcement learning network is an action;

an action generation module configured for inputting a state of each of the time slots into the hybrid deep reinforcement learning network to generate the action;

a network training module configured for training the hybrid deep reinforcement learning network; and an outputting module configured for after a number of repetitions reaches a specified number of time slots T, outputting a decision to be optimized comprising the user grouping, calculation of offloading, and a bandwidth allocation ratio at this time.

The apparatus of this embodiment may be used to realize the method described in the embodiment I.

The above is a detailed description of the present application, the above is only preferable embodiment of the present application, when the present application can not be limited to the scope of the present application, that is, all changes and modifications made in accordance with the scope of the present application shall fall within the scope of the present application.

What is claimed is:

1. A method for user grouping and resource allocation in a NOMA-MEC system, comprising:

step 1, constructing the NOMA-MEC system which operates in a time slot, wherein the NOMA-MEC system comprises K user devices and a single antenna base station connected to an edge server, and all users have only a single transmitting antenna to establish a communication link with the single antenna base station; and the NOMA-MEC system operates in the time slot, wherein the set of time slots is denoted as $\Gamma=\{1, 2, \ldots, T\}$;

a process of constructing the NOMA-MEC system comprises the following steps;

dividing a total bandwidth W of the NOMA-MEC system into N orthogonal sub-channels n, wherein a ratio of a bandwidth of the sub-channel n to the total bandwidth is $\tau_n$, $$\sum_{n=1}^{N} \tau_n = 1;$$

wherein $K=\{1, 2, \ldots, K\}$ and $N=\{1, 2, \ldots, N\}$ represent a set of users and a set of the orthogonal sub-channels, respectively, $K \leq 2N$;

dividing a whole process into the time slots $\Gamma=\{1, 2, \ldots, T\}$; a channel gain remains constant over a time period of one time slot and varies between different time slots, $h_{nk}$, $n \in N$, $k \in K$ denotes the channel gain on the sub-channel n from a user k to the single antenna base station, and $h_{n1} < h_{n2} < \ldots < h_{nK}$, $n \in [1,N]$ is set; and limiting one sub-channel only to transmit at most two user signals simultaneously, and the user transmitting signals on only one sub-channel in one time slot; wherein $m_{nk}=1$ indicates that the sub-channel n is allocated to the user k for transmitting signals, $m_{nk}=0$ indicates that the sub-channel n is not allocated to the user k for transmitting signals;

step 2, defining an energy efficiency of the NOMA-MEC system, wherein the defining the energy efficiency of the NOMA-MEC system comprises:

step 2.1) the energy efficiency Y of the NOMA-MEC system is defined as a sum of a ratio of a computation rate to a computation power of all users, as in a following formula:

$$y = \sum_{n=1}^{N}\sum_{i=2}^{K}\sum_{j=1}^{i-1}\left(x_{ni}\frac{R_{i,off}}{p_i} + x_{nj}\frac{R_{j,off}}{p_j} + (1-x_{ni})\frac{R_{i,local}}{p_{i,local}} + (1-x_{nj})\frac{R_{j,local}}{p_{j,local}}\right)$$

wherein, $R_{i,off}$ denotes a computation rate at which a user i offloads computational tasks to the edge server for execution, $p_i$ is a transmitting power of the user i, and does not vary over time and is the same for all users; $R_{i,local}$ denotes a computation rate at which the user i locally executes a task, $p_{i,local}$ denotes a power at which the user i locally executes the task, $x_{ni}=1$ denotes that the user i offloads the task through the sub-channel n to the edge server for execution, $x_{ni}=0$ denotes that the user i does not offload the task through the sub-channel n to the edge server for execution;

step 2.2) because a channel gain $h_{ni}$ of the user i on the sub-channel n is greater than a channel gain $h_{nj}$ of an user j; the single antenna base station decodes in descending orders according to a serial interference cancellation technique, an offload rate of the user i is $$R_{i,off} = m_{ni}\tau_n W \log_2\left(1 + \frac{p_i h_{ni}}{x_{nj} m_{nj} p_j h_{ni} + \tau_n W N_0}\right),$$

an offload rate of the user j is $$R_{j,off} = m_{nj}\tau_n W \log_2\left(1 + \frac{p_j h_{nj}}{\tau_n W N_0}\right),$$

where $N_0$ is a power spectral density of noise; and step 2.3) computation rates of the user i and the user j locally executed are $$R_{i,local} = \frac{f_i}{\phi} \text{ and } R_{j,local} = \frac{f_j}{\phi},$$

respectively, where $f_i$ and $f_j$ are a CPU processing power of the user, and $\phi$ is a number of cycles required to process a 1bit task; computation powers of the user i and the user j locally executed are $p_{i,local}=vf_i^3$ and $p_{j,local}=vf_j^3$, respectively, where v is a capacitive effective factor of a chip architecture of a user device;

step 3, constructing an optimization problem; wherein the optimization problem is constructed as:

$$\max_{m_{nk}, x_{nk}, \tau_n} \sum_{n=1}^{N}\sum_{i=2}^{K}\sum_{j=1}^{i-1}\left(x_{ni}\frac{m_{ni}\tau_n W \log_2\left(1 + \frac{p_i h_{ni}}{x_{nj} m_{nj} p_j h_{nj} + \tau_n W N_0}\right)}{p_i} + \right.$$

$$\left. x_{nj}\frac{m_{nj}\tau_n W \log_2\left(1 + \frac{p_j h_{nj}}{\tau_n W N_0}\right)}{p_j} + (1-x_{ni})\frac{1}{v\phi_i f_i^2} + (1-x_{nj})\frac{1}{v\phi_j f_j^2}\right)$$

s.t. C1: $x_{nk} \in \{0, 1\}$, $m_{nk} \in \{0, 1\}$, $\forall n \in [1, N], \forall k \in [1, K]$, C2: $\sum_{n=1}^{N} m_{nk} \leq 1$, $\forall k \in [1, K]$ C3: $\sum_{k=1}^{K} m_{nk} \leq 2$, $\forall n \in [1, N]$ C4: $\sum_{n=1}^{N} \tau_n = 1$ step 4, defining a state space for deep reinforcement learning, and an action space for the deep reinforcement learning; wherein the defining the state space for deep reinforcement learning, and the action space for deep reinforcement learning comprises:

step 4.1) the state space s, $s=\{h_{11}, h_{12}, \ldots h_{1K}, h_{21}, h_{22}, \ldots, h_{2K}, h_{N1} \ldots h_{NK}\}$;

step 4.2) the action space a comprises two phases a={a_c, a_d}, wherein a_c=$\{\tau_1, \tau_2, \ldots, \tau_N\}$ is a continuous action which indicates a bandwidth allocation ratio of the NOMA-MEC system, and a_d=$\{m_{11}, m_{12} \ldots, m_{1K}, \ldots, m_{N1}, m_{N2}, \ldots, m_{NK}, x_{11}, x_{12}, \ldots, x_{1K}, \ldots, x_{N1}, x_{N2}, \ldots, x_{NK}\}$ is a discrete action which indicates an allocation scheme of the sub-channel n;

step 5, constructing a hybrid deep reinforcement learning network, wherein an input of the hybrid deep reinforcement learning network is a state and an output of the hybrid deep reinforcement learning network is an action;

wherein constructing the hybrid deep reinforcement learning network comprises: the hybrid deep reinforcement network comprises a continuous layer deep reinforcement learning network and a discrete layer deep reinforcement learning network; the continuous layer deep reinforcement learning network is a deep deterministic policy gradient (DDPG), and the discrete layer deep reinforcement learning network is a deep Q-Network (DQN);

step 6, inputting a state of each of the time slots into the hybrid deep reinforcement learning network to generate the action, wherein the inputting the state of each of the time slots into the hybrid deep reinforcement learning network to generate the action comprises:

step 6.1) inputting the state of the NOMA-MEC system into the hybrid deep reinforcement learning network, generating the bandwidth allocation ratio a_c by an Actor network of the DDPG, and generating a user grouping situation a_d by the DQN network; and step 6.2) after the user grouping situation and the bandwidth allocation ratio are determined, a maximum energy efficiency of the NOMA-MEC system is decomposed into a maximum energy efficiency of each sub-channel;

the problem is transformed into $$\max_{x_{n,i}, x_{n,j}} Y_n = x_{ni} \frac{\tau_n W \log_2\left(1 + \frac{p_i h_{ni}}{x_{nj} m_{nj} p_j h_{ni} + \sigma^2}\right)}{p_i} +$$

$$x_{nj} \frac{m_{nj} \tau_n W \log_2\left(1 + \frac{p_j h_{nj}}{\sigma^2}\right)}{p_j} + (1 - x_{ni})\frac{1}{v\phi_i f_i^2} + (1 - x_{nj})\frac{1}{v\phi_j f_j^2}$$

where a matrix X is initialized as a zero matrix at each time; $(x_{n,i}, x_{n,j})$ has four possible values, (0, 0), (1, 0), (0, 1), (1, 1), where a value of x is to determine an offloading decision, where 0 means that no computation task of a user device is offloaded to the edge server for execution, and 1 means that offloading to the edge server for execution, and the four possible values is inputted into above formula to select one which makes $Y_n$ the maximum, and a value of a position corresponding to the matrix X is reset;

step 7, training the hybrid deep reinforcement learning network, wherein the training the hybrid deep reinforcement learning network comprises:

the base station in a state s receives an immediate reward $$r = \sum_{n=1}^{N} Y_n$$

feedback from environment after performing the action a={a_c, a_d}, and obtaining a state s' of a next time slot;

storing a sample (s,a_c,r,s') to a DDPG experience pool, and storing a sample (s,a_d,r,s') to a DQN experience pool, and the DDPG network and the DQN network share the state and the reward value; and training the DDPG network and the DQN network to update their own parameters by sampling D samples from the experience pool;

step 8, repeating steps 6 and 7 until a number of repetitions reaches a specified number of time slots T, and outputting a decision to be optimized comprising the user grouping, calculation of offloading, and a bandwidth allocation ratio at this time.

2. A device for user grouping and resource allocation in a NOMA-MEC system, comprising a processor and a storage medium;

wherein the storage medium is configured to store instructions;

the processor is configured for operating in accordance with the instructions to perform the method according to claim 1.

* * * * *